United States Patent [19]

Stang et al.

[11] Patent Number: 4,777,186

[45] Date of Patent: Oct. 11, 1988

[54] RESTRICTED EXPANSION FOAMING AND THE FLEXIBLE POLYURETHANE FOAM THEREBY PRODUCED

[75] Inventors: John W. Stang, Media; John R. Rucker, Norwood, both of Pa.

[73] Assignee: Scotfoam Corporation, Eddystone, Pa.

[21] Appl. No.: 45,396

[22] Filed: May 4, 1987

[51] Int. Cl.⁴ ............................................. C08G 18/30
[52] U.S. Cl. ....................................... 521/50; 521/172; 521/174; 521/137; 264/50; 264/51; 264/52
[58] Field of Search ................ 521/50, 172, 174, 137; 264/50, 51, 52

[56] References Cited

U.S. PATENT DOCUMENTS 3,488,300 1/1970 Burkholder et al. ............... 521/172
4,150,206 4/1979 Jourquin et al. ...................... 521/51

*Primary Examiner*—John Kight
*Assistant Examiner*—S. A. Acquah
*Attorney, Agent, or Firm*—Connolly and Hutz

[57] ABSTRACT

Polyurethane foams having improved physical properties are produced by placing a polymerizable polyurethane reaction mixture into a pressurizable chamber, then polymerizing the reaction mixture at an elevated pressure sufficient to prevent the resulting polymer from completely filling the chamber.

18 Claims, 1 Drawing Sheet

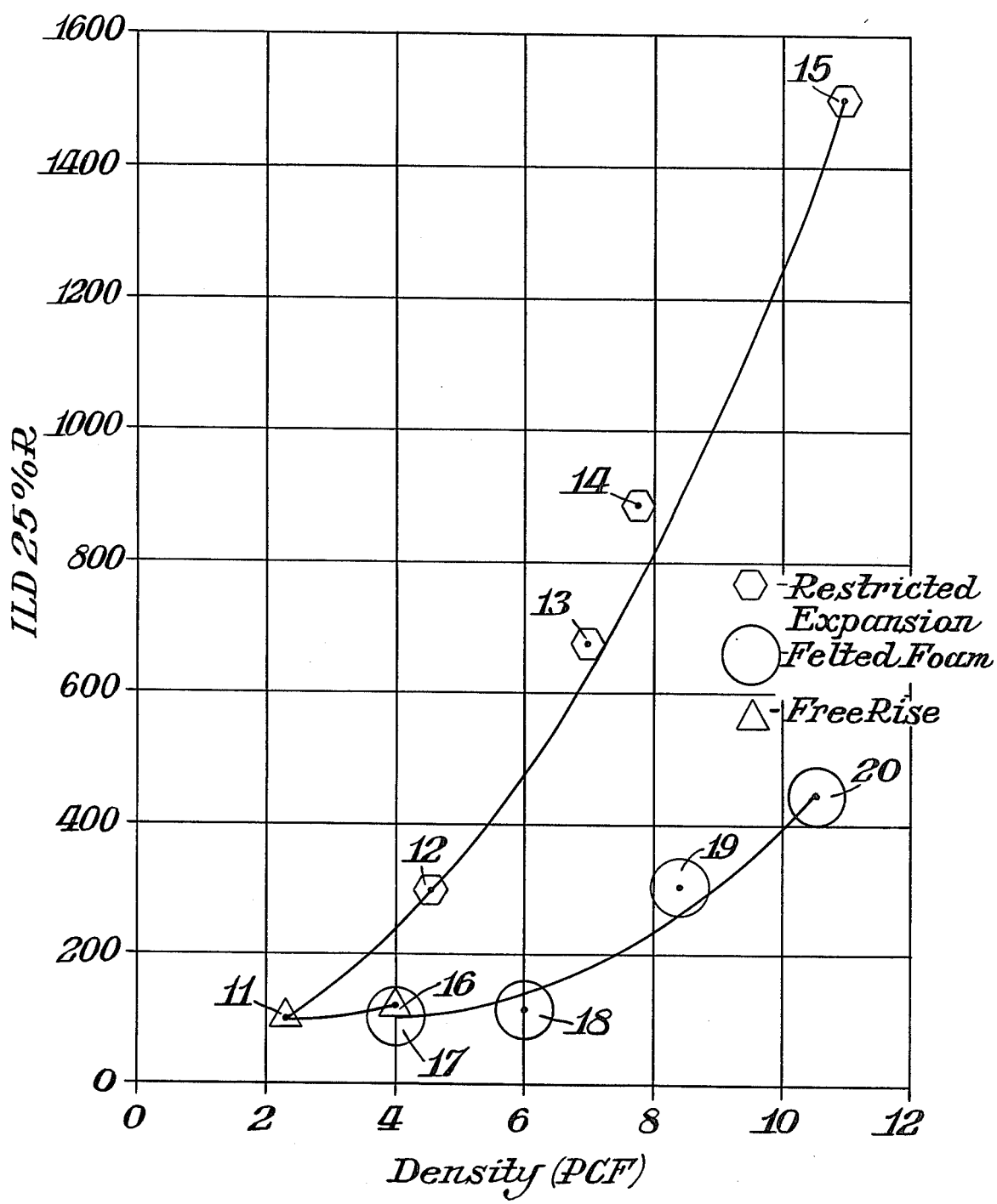

RESTRICTED EXPANSION FOAMING AND THE FLEXIBLE POLYURETHANE FOAM THEREBY PRODUCED

This invention relates to a process for producing flexible polyurethane foam and the flexible polyurethane foam so produced.

BACKGROUND OF THE INVENTION

Cellular polyurethanes are prepared by generating a gas during polymerization of a normally liquid (or plastic) reaction mixture. The gas causes foaming of the reaction mixture until the polymer sets or gels into a cellular structure or foam. The reaction mixture used to form such foams generally comprises an active hydrogen-containing compound, such as a polyether, a polyester, a polymer polyol or combination thereof and a polyisocyanate.

Flexible polyurethane foam is widely used in comfort cushions (furniture, bedding, automotive seating); in textiles (apparel, blankets); in industrial packaging, acoustics, filtration, and in insulation; as well as in household furnishings, sponges and the like. The versatility of polyurethane foam results not only from the nature and variety of the reaction mixture, but also from how the foam is prepared and processed. Foams ranging widely in density and hardness, in tensile and tear properties, in resistance to compression set and fatigue, in resilience and hysteresis in durability and toughness are obtained not only by the selection of the starting materials, but by the selection of the foaming process and subsequent processing.

Various processes are known for preparing flexible polyurethane foam. The processes may be broadly classified as molding processes or free rise processes.

In molding processes a liquid (or plastic) reaction mixture is injected into a vented chamber or mold and allowed to expand and completely fill the chamber. The resulting polymer is then cured. The final product retains the same size and shape of the cavity of the chamber.

In free rise processes the liquid (or plastic) reaction mixture is introduced into an open trough or on an open conveyor at ambient pressure and allowed to rise. Free rise processes may be further characterized in steps which are taken after the foam has risen. Most simply, the foam is allowed to cure and is then cut to a desired shape. Alternatively, the foam may be felted during rise, after rise or after cure. For Example, in felting a foam, a fully cured polyurethane foam is first cut into a predetermined form and then compressed and shaped while subjected to an elevated temperature. In another example a flexible, densified polyurethane foam is prepared by allowing a polyurethane foam-forming reaction mixture to rise and form a partially cured cellular material. The partially cured cellular material is then maintained for a critical time at a critical temperature while the partially cured material has a compressive force applied to permanently reduce its volume. In such a process it is known that the compressive force causes the cellular structure of a foam to collapse.

U.S. Pat. No. 3,488,300 discloses a method of controlling cell size and preventing fissures in flexible, elastomeric, cellular polyurethane. These objects are achieved by mixing reaction components under pressure. Although a pressure of from 0.5 to 60 psig is used in the mixing chamber during component blending, there is no suggestion of a pressure imposed on the mixture during polymerization. The pressure is said to be maintained only until the reaction mixture is poured onto a casting surface or into a mold. Also, the increased cell sizes are indicative of pressure release before polymerization of the mixture.

BRIEF DESCRIPTION OF THE INVENTION

In the process of the present invention a liquid or plastic polyurethane reaction mixture is introduced into a pressurizable chamber. Using the pressure created by the gas generated by the reaction mixture during the formation of the polyurethane foam alone, or in conjunction with a second gas added to the chamber from an outside source, the expansion of the foam is restricted and the foam is not permitted to fill the entire chamber. In contrast to known processes, the cellular structure of the foam does not collapse. The foam is then cured and cut to the desired shape. Surprisingly, foams prepared in accordance with this process exhibit excellent physical properties such as ILD, CLD, tensile and tear strength. ILD is Indentation Load Deflection (also called "Indentation Force Deflection") and is a measure of the back force a polyurethane foam will exert against a circular compression plate eight inches in diameter (50 sq. in.) with a sample size of 15 by 15 by 4 inches as per ASTM 3574. Thus the units of ILD are pounds per 50 square inches. CLD is Compression Load Deflection and is analogous to ILD except that a smaller sample is needed and the pressure the foam presents to a compression plate is measured in pounds per square inch. For CLD a compression plate of 3.5 inch diameter (9.6 sc. in.) and a sample size of 2 by 2 by 1 inches are used. Of particular interest is the ratio of ILD to density possessed by the flexible polyurethane foams prepared in accordance with the invention. All reported ILD and CLD's are at a 25% rest value.

DETAILED DESCRIPTION

Flexible polyurethane foams possessing inter alia, a high ILD to density ratio (Guide Factor) are prepared by introducing a polymerizable polyurethane reaction mixture into a pressurizable chamber then polymerizing the reaction mixture at a pressure sufficient to prevent the polymer from completely filling the chamber.

It is an object of the present invention to achieve physical properties in a flexible polyurethane foam not attainable in a free rise or secondary process known at this time, where the type of chemical components are kept constant. This can be done by restricting the expansion of a chemical foam mix in a pressure vessel with either gases being generated through the normal chemical reaction or the addition of a gas prior to, simultaneously, or after the introduction of the foam mix to the chamber.

By the process of this invention, ILD values are obtainable which are unknown in the prior art. For example, using a conventional free rise foam production method, a foam density of about 2 pounds with an ILD value of about 40 is typical. Foams prepared by the process of this invention with an equivalent density of 2 pounds have ILD values of 140 or more are typical. In addition to higher ILD values, the present process can also be used to produce higher foam densities in situ. Conventional free rise foam processes produce foams with a typical density range of 1 to 6 pounds/cu ft at top of rise whereas densities of greater than 6 pounds/cu ft at top of rise are obtainable with the present invention.

To produce foams with these improved properties several embodiments of pressurized foaming are available. First, a polyurethane foaming mixture can be placed into a closed chamber at atmospheric pressure and reaction allowed to take place until it is complete. Pressure developed is determined by the amount of mix, type polyol and the ratio of polyol water and isocyanate.

A second embodiment involves placing a predetermined amount of a polyurethane foaming mixture into a closed chamber at elevated pressure and allowing the reaction to take place until complete. Pressure developed by the reaction along with the elevated pressure of the chamber determines the properties of the foam produced.

A third embodiment involves foaming under a constant pressure. To achieve this embodiment, a predetermined amount of a polyurethane foaming mixture is placed into a closed chamber at elevated pressure. Then as the foaming mixture reacts, any pressure generated by the reaction is vented thereby maintaining a substantially constant pressure throughout the foaming reaction. By a slight modification of this embodiment the process can be made continuous. When foaming mixture is added to the pressure chamber continuously and the chamber vented to a constant pressure during the continuous foaming reaction, a continuous stream of the improved polyurethane foam of this invention can be obtained.

A fourth embodiment involves pressurizing the closed chamber in which foaming takes place with a predetermined amount of a pressurizing gas to achieve a predetermined pressure after the reactive foaming mixture has been placed in the chamber.

A fifth embodiment involves simultaneously placing the reactive foaming mixture and a pressurizing gas into the closed chamber.

In each of the embodiments of this invention, the properties of the foam obtained are determined by both the pressure used during the foaming and by the type polyol and the ratio of polyol water and isocyanate.

The pressure employed is usually greater than 0.5 pound per square inch gauge. There is no upper limit to the pressure which can be used and the only practical limitation lies in the equipment used. Preferred pressure range is 0.5 psig to 1,000 psig. At high pressures it will be necessary to use a gas to pressurize the reaction vessel. Suitable gases for that purpose include all industrially available gas such as air, helium, argon, nitrogen, oxygen, carbon dioxide and so forth. The chemical nature of the gas is not critical.

The polyurethane foaming mixture used is a conventional mixture. The mixture comprises an isocyanate, a polyol and water. The preferred isocyanates are aromatic diisocyanates, such as toluenediisocyanates, methlenediphenyldiisocyanates, p,p'-diphenyldiisocyanate, and so forth, but as it is known, other polyisocyanates such as an aliphatic isocyanate like hexamethylenediisocyanate may be employed if desired.

Polyols which can be used include any poly-functional alcohol and include glycols, polyester polyols, polyether polyols and so forth. When the polyol used is a polyester polyol, the urethane produced is designated a polymeric polyester polyurethane. Similarly, a polymeric polyether polyurethane is prepared from a polyether polyol. The specific polyols used are known in the art and are fully described in, for example, U.S. Pat. Nos. 3,025,200 and 3,171,820 which are hereby incorporated by reference.

The foams of this invention can be filled or unfilled. When filled foams are desired, the process of this invention is carried out with the reactive foaming mixtures containing a suitable filler. Suitable fillers are, per se, known in the art and include, for example, calcium carbonate, barium sulfate, hydrated alumina, decabromodiphenyl oxide, melamine, calcium silicates, mica, diatomacious earth, titanium dioxide and so forth.

The function of water in the foaming mixture is three fold in the present invention. In the prior art, water was used to react with isocyanate to produce carbon dioxide gas which in turn caused the reaction mixture to primarily foam the mixture and second to form urea groups. In addition to those two functions, the present invention utilizes carbon dioxide gas generated to at least partially contribute to the pressure required in the process.

Flexible polyurethane foams prepared by the process of this invention have fundamentally the same utility as prior art flexible polyurethane foams but have superior physical properties, including higher density, higher ILD values and so forth. Thus, the polyurethane foam of this invention can be used for carpet padding, cushioning padding, and so forth.

BRIEF DESCRIPTION OF THE DRAWING

The Fig. shows the relationship in graph form of ILD at 25% rest and density for three types of foam processes.

The following examples are presented to further illustrate the present invention but are not intended to limit the scope of the invention.

EXAMPLE 1

Toluene diisocyanate (TDI) in a 10% stoichiometeric excess was mixed with 100 parts polyether polyol (Union Carbide 16-56). Water was added in a ratio of 5 parts per 100 parts polyol. The mixture was placed in a closed chamber and reacted under foaming conditions. The chamber was pressurized by the gas produced in situ during the foaming reaction. The resulting polyurethane foam had a density of 2.46, an ILD of 139 and an ILD/density ratio of 56.

EXAMPLE 2

The procedure of Example 1 was repeated except that a 20% stoichiometric excess of TDI (68.8 parts TDI) and 5 parts water per 100 parts polyol were used. The pressure was maintained at a uniform 14.5 psig. by initially adding a pressurizing gas and subsequently venting the chamber to a constant 14.5 psig. as the reaction produced gas. The foam produced had a density of 2.67, and ILD of 160 and an ILD/density ratio of 60.

EXAMPLE 3

(Comparison)

Example 2 is repeated except the water used was 2.3 parts per 100 parts polyol. The foaming reaction was in an open chamber at atmospheric pressure. The gas generated during the reaction was released and foaming proceeded in a free rise manner. The foam density was 2.5, the ILD value was 35 and the ILD/density ratio was 14.

EXAMPLE 4

TDI in a 5% stoichiometric excess was mixed with 100 parts of Witco Chemical Co. polyester polyol F-53 and 3.6 parts water. The mixture was reacted in a closed chamber and during the reaction, the pressure rose from 0 to 5 inches of mercury. The polyurethane foam after thermal reticulation had a density of 1.8, and ILD of 35 and ILD/density ratio of 19.5.

EXAMPLE 5

The procedure of Example 4 was repeated except that 4.8 parts water were used and during the foaming reaction the pressure rose to 19 inches of mercury. The foam produced after thermal reticulation had a density of 2.12, and ILD of 65 and and ILD/density ratio of 30.7.

EXAMPLE 6

(Comparison)

Example 4 was repeated except that the water used was 3.6 parts and the foaming reaction was at atmospheric pressure with the gas generated during the reaction vented. Foaming thus proceeded in a free rise manner. The foam produced after thermal reticulation had a density of 1.82, and ILD of 30.5 and an ILD/density ratio of 16.8.

EXAMPLE 7

TDI in a 10% stoichiometric excess was mixed with 100 parts of polyether polyol (Union Carbide 16-56) and 5 parts water. The foaming reaction mixture was restricted in its expansion by initially pressurizing the reaction chamber to a pressure of 14.5 psig. and maintaining the pressure at that level by venting gas produced during the reaction. The polyurethane foam produced had a density of 2.62, and ILD of 139 and an ILD/density ratio of 53.

EXAMPLE 8

(Comparison)

Example 7 was repeated except the foaming reaction was carried out at atmospheric pressure. The foam produced by this free rise procedure had a density of 1.28, and ILD of 25 and an ILD/density ratio of 19.

EXAMPLE 9

TDI in a 20% stoichiometric excess was mixed with 100 parts of polyether polyol (Union Carbide 16-56) and 4 parts water. The foaming reaction mixture was restricted in its expansion by initially pressurizing the reaction chamber to a pressure of 10.5 psig. and maintaining the pressure at that level by venting gas produced during the reaction. The polyurethane foam produced had a density of 2.74, and ILD of 131 and an ILD/density ratio of 48.

EXAMPLE 10

(Comparison)

Example 9 is repeated except that the foaming reaction is carried out at atmospheric pressure. This free rise procedure produces a foam with a density of 1.7, and ILD of 40 and an ILD/density ratio of 24.

FURTHER EXAMPLES

To pictorially illustrate the effects of the present invention on the ILD to density ratio of polyurethane foams produced, ILD and density data from the following examples were plotted on the Figure. The numeral legends on the Figure identify plotted density/ILD values of the corresponding example number.

EXAMPLE 11

(Comparison Free Foaming)

A polyurethane foam was produced from a mixture of 80 parts polymer polyol, 20 parts polyether polyol, 2.3 parts water and TDI in an amount 20% in excess of the stoichiometric amount required. The reaction mixture was poured into a pressurizable reaction chamber vented to the atmosphere and the foaming reaction was conducted under atmospheric pressure. The resulting foam had a density of 2.15 pounds per cubic foot (pcf) and an ILD of 100.

EXAMPLE 12

Example 11 was repeated except the pressurizable chamber was closed to the atmosphere and 5 psig gas pressure was applied to the reaction immediately after liquid was poured into the chamber. The resulting foam had a density of 4.23 pcf and an ILD of 290.

EXAMPLE 13

Example 12 was repeated except that the pressure was 25 psig. The foam produced had a density of 6.89 pcf with an ILD of 650.

EXAMPLE 14

Example 12 was repeated except that the pressure was 30 psig. The foam produced had a density of 7.9 pcf and an ILD of 860.

EXAMPLE 15

Example 12 was repeated except that the pressure was 50 psig. The foam produced had a density of 11.0 pcf and an ILD of 1480.

EXAMPLE 16

(Comparison Free Foaming)

Example 11 was repeated except that the amount of water used was lowered to 1.2 parts. The foam produced had a density of 4.03 pcf and an ILD of 110.

EXAMPLE 17

(Felted Comparison)

A sample of foam produced by the process of Example 11 with a thickness of 2 inches was felted (compressed) to a thickness of one inch. The resulting foam had a density of 4.21 pcf and an ILD of 100 with severe density gradient.

EXAMPLE 18

(Felted Comparison)

A sample of foam produced by the process of Example 11 with a thickness of 3 inches was felted to a thickness of one inch. The resulting foam had a density of 6.06 pcf and an ILD of 110 with severe density gradient.

EXAMPLE 19

(Felted Comparison)

A sample of foam produced by the process of Example 11 with a thickness of 4 inches was felted to a thickness of one inch. The resulting foam had a density of 8.35 pcf and an ILD of 290 with moderate density gradient.

EXAMPLE 20

(Felted Comparison)

A sample of foam produced by the process of Example 11 with a thickness of 5 inches was felted to a thickness of one inch. The resulting foam had a density of 10.6 pcf and an ILD of 410 with slight density gradient.

A summary of the data from Examples 11-20 are plotted on the Figure appears in the following table.

TABLE

| Example | Foam Type | Density | ILD |
|---|---|---|---|
| 11 | Free Rise | 2.15 | 100 |
| 12 | Invention | 4.23 | 290 |
| 13 | Invention | 6.89 | 650 |
| 14 | Invention | 7.9 | 860 |
| 15 | Invention | 11.0 | 1480 |
| 16 | Free Rise | 4.03 | 110 |
| 17 | Felted | 4.21 | 100 |
| 18 | Felted | 6.06 | 110 |
| 19 | Felted | 8.35 | 290 |
| 20 | Felted | 10.6 | 410 |

What is claimed is:

1. A process for preparing flexible polyurethane foams comprising placing a polymerizable polyurethane reaction mixture into a pressurizable chamber, then polymerizing the reaction mixture at an elevated pressure sufficient to prevent the resulting polymer from completely filling the chamber.

2. A process according to claim 1 wherein the pressure is generated by gases produced in situ during the polymerization of the reaction mixture.

3. A process according to claim 2 wherein the pressure is partially produced by the addition of gas to the pressurizable chamber prior to the addition of the reaction mixture.

4. A process according to claim 2 wherein the pressure is partially produced by the addition of gas to the pressurizable chamber after the addition of the reaction mixture.

5. A process according to claim 2 wherein the pressure is regulated to a substantially constant super-atmospheric pressure by venting the pressurizable chamber during the reaction.

6. A process according to claim 1 wherein the elevated pressure in the chamber is provided by a gas under pressure which is placed in the chamber simultaneously with the reaction mixture.

7. A process according to claim 1 wherein the reaction mixture comprises an isocyanate, water and a polyol which is a polyether polyol, polyester polyol, polymer polyol or any combination thereof.

8. A process according to claim 7 wherein the reaction mixture comprises a polyether polyol reaction mixture.

9. A process according to claim 7 wherein the reaction mixture comprises a polymer polyol reaction mixture.

10. A process according to claim 7 wherein the reaction mixture comprises a polyester polyol reaction mixture.

11. A flexible polyurethane foam produced by the process of claim 1 wherein the ILD to density ratio rises as the density rises.

12. A polyurethane foam according to claim 11 wherein the foam is a polyether polyurethane and the ILD to density ratio is at least 30.

13. A polyurethane foam according to claim 11 wherein the foam is a polymer polyol polyurethane and the ILD to density ratio is at least 75.

14. A polyurethane foam according to claim 11 wherein the foam is a polyester polyurethane and the ILD to density ratio is at least 45.

15. A flexible polyurethane foam prepared by the process of claim 1 wherein the reaction mixture contains an inert foam filler material.

16. A filter-free flexible polyether polyol polyurethane foam having a substantially uniform density, an ILD value of at least 50, and an ILD to density ratio of at least 30.

17. A flexible polymer polyol polyurethane foam having a substantially uniform density, an ILD value greater than 200, and an ILD to density ratio of at least 75.

18. A flexible polyester polyurethane foam having a substantially uniform density, an ILD value of greater than 100, and ILD to density ratio of at least 45.

* * * * *